US011275868B2

(12) United States Patent
Geis et al.

(10) Patent No.: US 11,275,868 B2
(45) Date of Patent: Mar. 15, 2022

(54) PHOSPHOR-LOADED WAVEGUIDE

(71) Applicant: Massachusetts Institute Of Technology, Cambridge, MA (US)

(72) Inventors: Michael W. Geis, Acton, MA (US); Joshua Kramer, Branchburg, NJ (US); Karen M. G. V. Gettings, Carlisle, MA (US); Marc J. Burke, Pelham, NH (US); Mankuan M. Vai, Sudbury, MA (US); Theodore M. Lyszczarz, Concord, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 16/917,964

(22) Filed: Jul. 1, 2020

(65) Prior Publication Data

US 2021/0012034 A1    Jan. 14, 2021

Related U.S. Application Data

(63) Continuation of application No. 15/548,027, filed as application No. PCT/US2016/020047 on Feb. 29, 2016, now Pat. No. 10,740,493.

(Continued)

(51) Int. Cl.
*G02B 6/42* (2006.01)
*G06F 21/70* (2013.01)
(Continued)

(52) U.S. Cl.
CPC ............ *G06F 21/70* (2013.01); *G02B 6/0003* (2013.01); *G02B 6/4214* (2013.01);
(Continued)

(58) Field of Classification Search
CPC .................................. G02B 6/42; G02F 21/70
(Continued)

(56) References Cited

U.S. PATENT DOCUMENTS 4,884,860 A * 12/1989 Brown ................. G02B 6/2817
385/27
6,028,977 A * 2/2000 Newsome ............... G02F 1/011
250/330

(Continued)

FOREIGN PATENT DOCUMENTS

DE     102010015258 A1    10/2011

OTHER PUBLICATIONS

International Search Report and Written Opinion dated Nov. 3, 2016 in corresponding PCT application No. PCT/US2016/020047.

(Continued)

*Primary Examiner* — Kaveh C Kianni
(74) *Attorney, Agent, or Firm* — Nields, Lemack & Frame, LLC

(57) ABSTRACT

An improved waveguide is disclosed. The waveguide utilizes a luminescent material disposed within or around its perimeter to introduce additional light into the waveguide. For example, the waveguide may include a plurality of planar layers having different refractive indexes. A luminescent material may be disposed along the outer edge of these layers. When light from within the waveguide strikes the luminescent material, it emits light, thereby adding to the light in the waveguide. Not only does the luminescent material introduce more light into the waveguide, it also introduces more light sources, thereby making it more difficult to introduce a probe without blocking at least a portion of the light destined for the image sensor. The luminescent material may be a phosphor.

11 Claims, 5 Drawing Sheets

Related U.S. Application Data

(60) Provisional application No. 62/130,208, filed on Mar. 9, 2015.

(51) Int. Cl.

| | | |
|---|---|---|
| *H04L 29/06* | (2006.01) | |
| *F21V 8/00* | (2006.01) | |
| *G06F 21/72* | (2013.01) | |
| *G06K 9/00* | (2022.01) | |
| *G02B 6/43* | (2006.01) | |

(52) U.S. Cl.
CPC ........... *G02B 6/4298* (2013.01); *G06F 21/72* (2013.01); *G06K 9/00577* (2013.01); *H04L 63/04* (2013.01); *H04L 63/162* (2013.01); *G02B 6/4215* (2013.01); *G02B 6/4295* (2013.01); *G02B 6/43* (2013.01); *G06K 2009/0059* (2013.01)

(58) Field of Classification Search
USPC ............................................ 713/189; 385/47
See application file for complete search history.

(56) References Cited

U.S. PATENT DOCUMENTS

| | | | | |
|---|---|---|---|---|
| 6,081,632 | A * | 6/2000 | Yoshimura | B82Y 20/00 385/5 |
| 6,141,476 | A * | 10/2000 | Matsuura | G02B 6/032 385/125 |
| 6,160,273 | A * | 12/2000 | Fork | H01L 51/5262 257/103 |
| 10,740,493 | B2 | 8/2020 | Geis et al. | |
| 2002/0003928 | A1 | 1/2002 | Bischel et al. | |
| 2004/0120684 | A1* | 6/2004 | Ishibashi | G02B 6/2821 385/141 |
| 2004/0161192 | A1* | 8/2004 | Hamano | G02B 6/0013 385/31 |
| 2005/0248267 | A1* | 11/2005 | Gyoutoku | H01L 51/5278 313/506 |
| 2009/0129115 | A1* | 5/2009 | Fine | G02B 6/0061 362/606 |
| 2009/0161341 | A1* | 6/2009 | Meir | G02B 6/0065 362/84 |
| 2009/0277494 | A1* | 11/2009 | Mazzer | F24S 23/00 136/246 |
| 2010/0002414 | A1* | 1/2010 | Meir | G02B 6/0021 362/84 |
| 2010/0008628 | A1* | 1/2010 | Shani | G02B 6/0018 385/49 |
| 2010/0303409 | A1* | 12/2010 | Ku | G02B 6/0003 385/32 |
| 2011/0085319 | A1* | 4/2011 | Hikmet | G02B 6/0073 362/84 |
| 2011/0232211 | A1* | 9/2011 | Farahi | H01L 31/055 52/173.3 |
| 2011/0299561 | A1* | 12/2011 | Akiyama | H01S 5/02325 372/50.11 |
| 2011/0320314 | A1 | 12/2011 | Brown | |
| 2012/0033810 | A1* | 2/2012 | Devadas | G09C 1/00 380/46 |
| 2012/0170303 | A1* | 7/2012 | Meir | G02B 6/0041 362/555 |
| 2013/0058610 | A1* | 3/2013 | Shani | G02B 6/002 385/49 |
| 2013/0215597 | A1* | 8/2013 | Davis | F21V 7/28 362/84 |
| 2013/0241435 | A1* | 9/2013 | Lamvik | F21V 9/38 315/291 |
| 2013/0272014 | A1* | 10/2013 | Logunov | G02B 6/001 362/554 |
| 2016/0252666 | A1* | 9/2016 | Tissot | F21V 13/08 362/583 |
| 2018/0025182 | A1* | 1/2018 | Geis | H04L 63/04 713/189 |

OTHER PUBLICATIONS

International Preliminary Report on Patentability dated Sep. 12, 2017 in corresponding PCT application No. PCT/US2016/020047.
Spain et al., "Robust Keys from Physical Unclonable Functions," 2014 IEEE International Symposium on Hardware-Oriented Security and Trust (HOST), pp. 88-92, 2014.
Vai et al., "Secure Architecture for Embedded Systems," IEEE 2015.

* cited by examiner

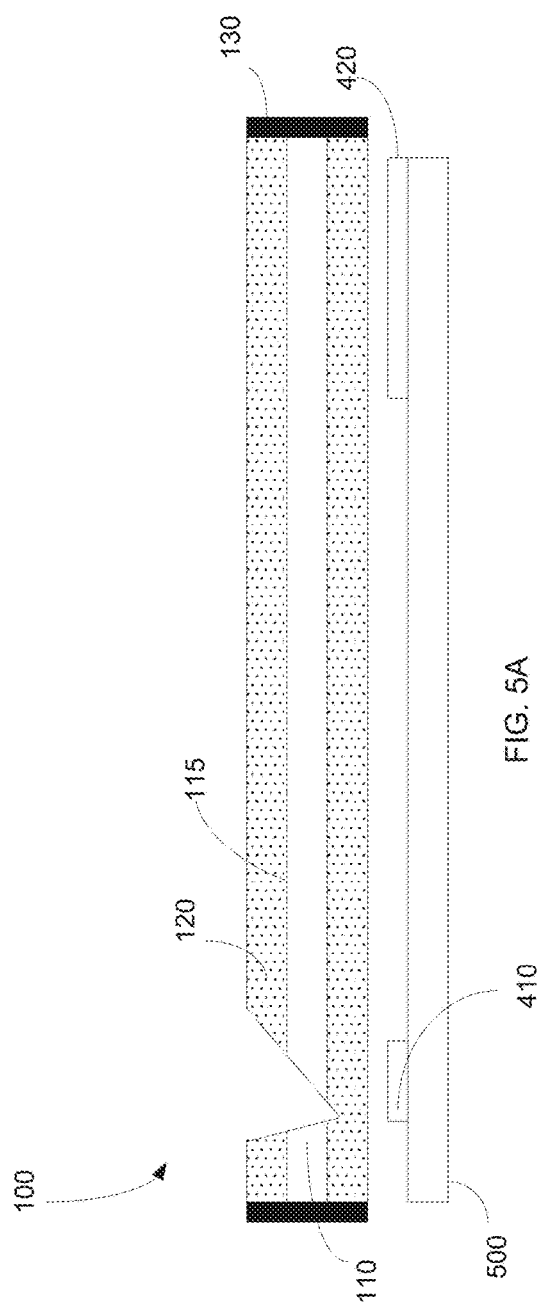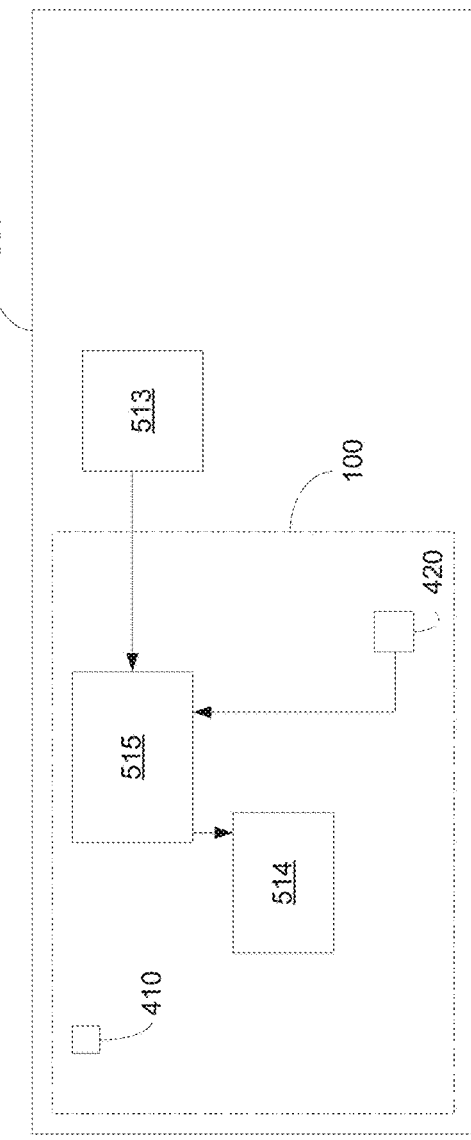

PHOSPHOR-LOADED WAVEGUIDE

This application is a Continuation of U.S. patent application Ser. No. 15/548,027 filed on Aug. 1, 2017, which is a 371 of PCT/US2016/020047 filed Feb. 29, 2016, which claims priority of U.S. Provisional Patent Application Ser. No. 62/130,208, filed Mar. 9, 2015, the disclosures of which are herein incorporated by reference in their entireties.

This invention was made with Government support under Contract No. FA8721-05-C-002 awarded by the U.S. Air Force. The Government has certain rights in the invention.

FIELD

This disclosure relates to waveguides used for physically unclonable functions applicable on fully functional printed circuit boards.

BACKGROUND

Security is becoming increasingly important as the internet and electronic devices become more pervasive. For example, computers and even mobile telephones are equipped with biometrics to prevent access by unauthorized users.

Encryption is also used to prevent unauthorized access to devices and information. For example, data can be encrypted before being transmitted on the internet. Other techniques, such as security tokens, are also employed to limit access to devices.

In addition, many electronic systems require a unique digital identifier for authentication, key derivation and other purposes. These electronic systems are often manufactured using traditional manufacturing processes. Creating a unique digital identifier in this environment is often difficult and time consuming. Furthermore, to be effective, the unique digital identifier should be extremely different or nearly impossible to determine and copy.

One method of creating this unique digital identifier is through the use of waveguides. FIG. 1 shows a cross section of a printed circuit board 10 with a conventional planar waveguide 20. The printed circuit board 10 includes one or more light sources 11. These light sources 11 emit light that enters the waveguide 20 by means of angle mirror 26 cut into the waveguide 20. The light initially appears in both the inner core 21 and the outer cladding 22, but an absorptive layer of material 25 absorbs the light in the outer cladding 22. The printed circuit board 10 also includes an image sensor 12, such as a CCD image sensor. Light in the inner core 21 is not coupled to the image sensor 12, but inhomogeneities 27 in the inner core 21 scatter light into the outer cladding 22 where some fraction of this light is received by the image sensor 12. Thus, some portion of the light emitted from the light sources 11 reaches the image sensor 12. The light pattern created on the image sensor 12 is then converted to a digital value. Slight differences in the structure of the waveguide 20 affect the resulting light pattern, causing unique patterns to be reflected onto the image sensor 12. Thus, the light pattern represents the unique identifier.

As mentioned above, these waveguides 20 are traditionally constructed using an inner core 21 surrounded by an outer cladding 22. The outer cladding 22 is then covered by a reflective silver layer 24. The inner core 21 may have a higher refractive index (n) than the outer cladding 22. For example, the inner core 21 may have a refractive index of 1.59, while the outer cladding has a refractive index of 1.49. Light is reflected at the boundary between the inner core 21 and the outer cladding 22 or at the boundary between the outer cladding 22 and the silver layer 24.

As shown in FIG. 1, the incident angle of the light determines at which boundary the light is reflected. Higher incident angle light is reflected at the boundary between the inner core 21 and the outer cladding 22, while lower incident angle light is reflected at the silver layer 24. For example, using the refractive indices described above, light with an incident angle of 70° to 90° will remain trapped in the inner core 21. Light with a lower incident angle, such as 60° to 70°, are contained within both the inner core 21 and the outer cladding 22. Further, at incident angles less than roughly 60°, the light will exit the outer cladding 22 and may be reflected by the silver layer 24.

FIG. 2 shows a top view of the waveguide 20 of FIG. 1. Disposed under the waveguide 20 are a light source 11 and an image sensor 12. Light is emitted from the light source 11 and traverses the waveguide 10 to the image sensor 12. FIG. 2 also shows an intrusive probe 13 that has been inserted into the waveguide 10. If the probe 13 is not inserted into the direct path between the light source 11 and the image sensor 12, its affect on the reflected light pattern received by the image sensor 12 may be minimal. For example, there may be some small amount of light 15 reflected off the probe 13 that may affect the reflected pattern; however, most of the light in the waveguide 20 that is destined for the image sensor 12 is unaffected by the probe 13. If the probe 13 is not inserted in the direct light path, the shadow 14 cast by the probe 13 may have no affect on the reflected light pattern received by the image sensor 12.

However, ideally, the light pattern should be significantly affected by the insertion of an intrusive probe 13, regardless of the location of that insertion. Therefore, it would be beneficial if there were a waveguide where the reflected light pattern is more significantly affected by the insertion of a probe. Furthermore, it would be advantageous if this significant change in the reflected light pattern occurred regardless of the location of the insertion.

SUMMARY

An improved waveguide is disclosed. The waveguide utilizes a luminescent material disposed within or around its perimeter to introduce additional light into the waveguide. For example, the waveguide may include a plurality of planar layers having different refractive indexes. A luminescent material may be disposed along the outer edge of these layers. When light from within the waveguide strikes the luminescent material, it emits light, thereby adding to the light in the waveguide. Not only does the luminescent material introduce more light into the waveguide, it also introduces more light sources, thereby making it more difficult to introduce a probe without blocking at least a portion of the light destined for the image sensor. The luminescent material may be a phosphor.

BRIEF DESCRIPTION OF THE DRAWINGS

For a better understanding of the present disclosure, reference is made to the accompanying drawings, which are incorporated herein by reference and in which:

FIG. 5A shows a cross-section view of the waveguide of FIG. 3A and FIG. 5B shows a top view of a printed circuit board using the waveguide of FIG. 3A.

DETAILED DESCRIPTION

The present disclosure describes a waveguide that may be used with fully fabricated printed circuit boards to create a physically unclonable function. As described above, the waveguide utilizes a luminescent material disposed within or around its perimeter to introduce additional light into the waveguide. When light from within the waveguide strikes the luminescent material, that luminescent material also emits light, thereby adding to the light in the waveguide.

Figure 1:
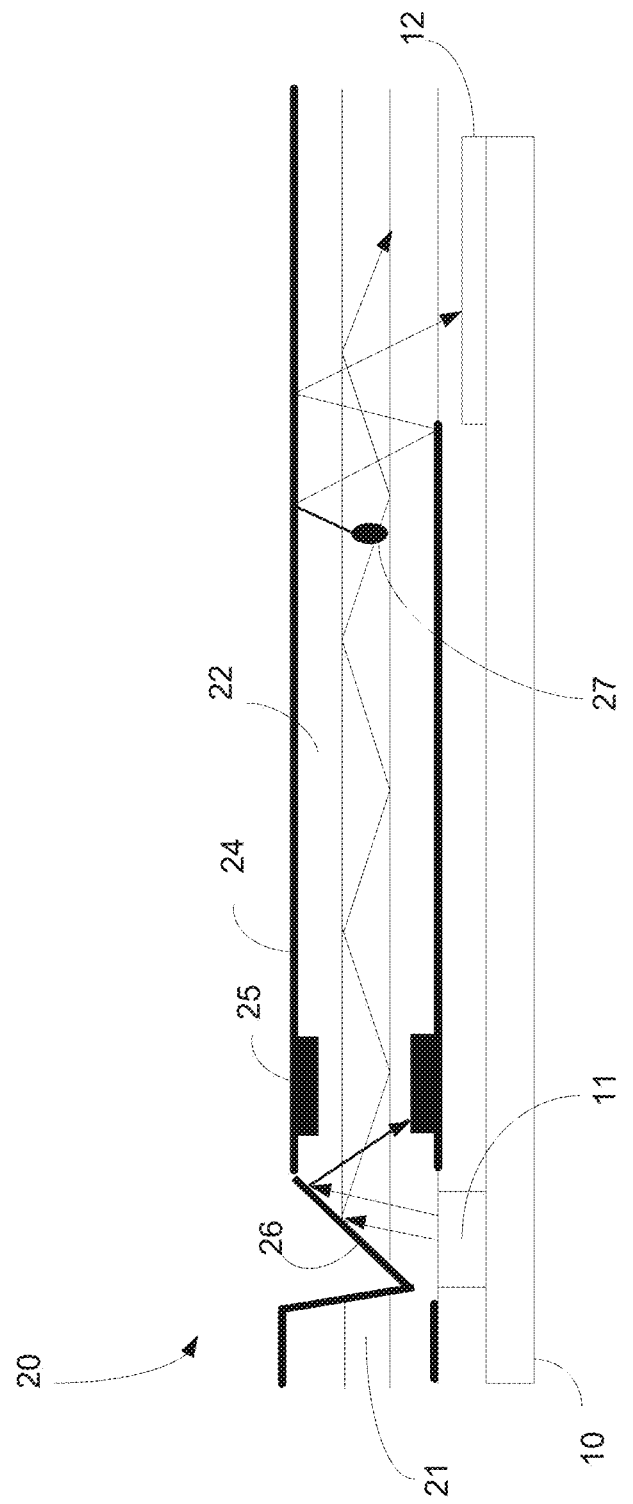
FIG. 1 shows a printed circuit board with a waveguide according to the prior art.
Figure 2:
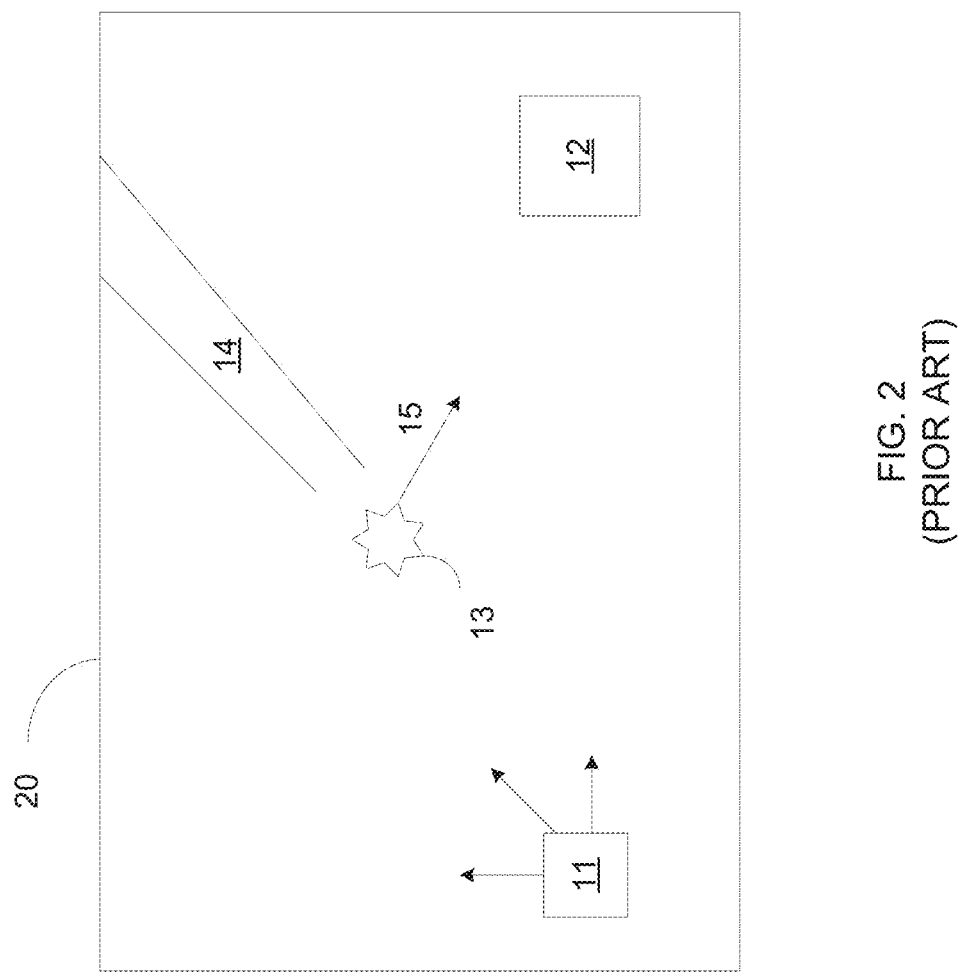
FIG. 2 shows a top view of a waveguide of the prior art with an intrusive probe inserted into the waveguide.
Figure 3A:
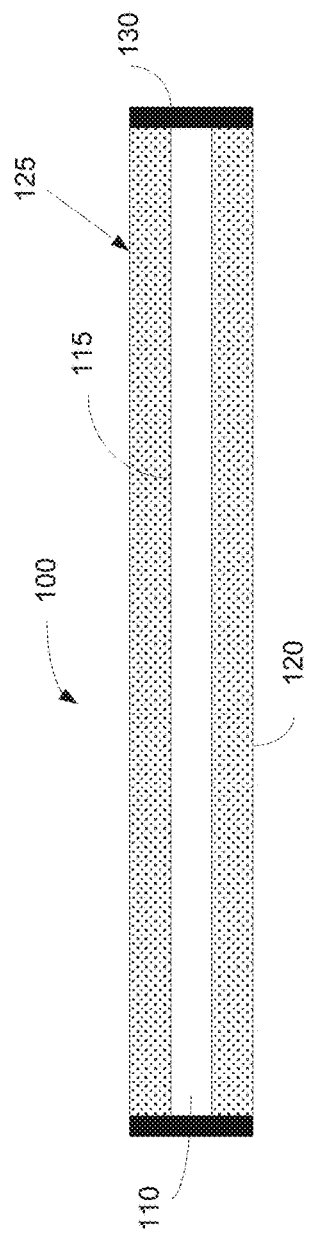
FIG. 3A shows a cross-sectional view of the waveguide according to one embodiment and FIG. 3B shows a top view of the waveguide.
Figure 3B:
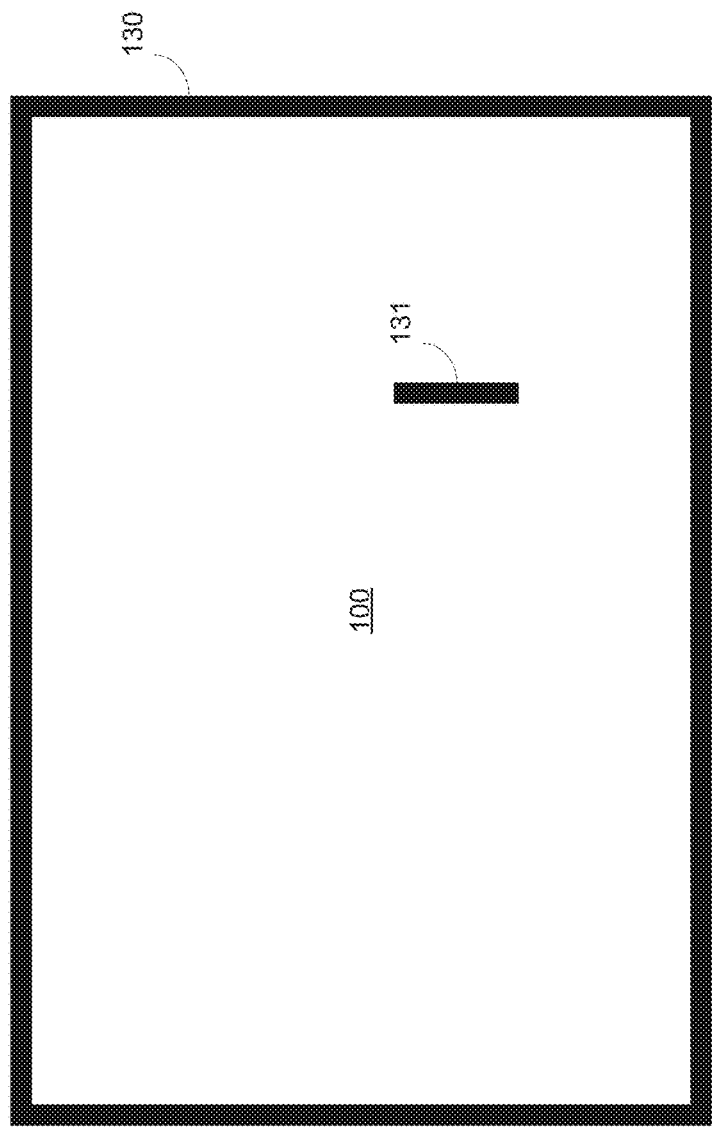

FIG. 3A shows a cross-sectional view of the waveguide 100 according to one embodiment. FIG. 3B shows a top view of the waveguide 100. As shown in FIG. 3A, the waveguide 100 may include an inner core 110, which is sandwiched on both sides by an outer cladding 120. In other words, there are two layers of outer cladding 120, where one layer is disposed on each side of the inner core 110. In another embodiment, the outer cladding 120 may be applied to only one surface of the inner core 110. In yet another embodiment, the outer cladding 120 may cover only a portion of the inner core 110 on one or both sides.

In certain embodiments, the inner core 110 and the outer cladding 120 may both be polymers. In certain embodiments, the inner core 110 may be a transparent material.

The two materials used in the waveguide 100 each have different refractive indices, with the inner core 110 having a higher index than the outer cladding 120. The inner core 110 and the outer cladding 120 meet at an inner interface 115.

Each of the layers of the waveguide 100 may be planar, where each layer is a thin rectangular prism. Further, the layers are stacked on top of each other to form an assembly 125, where the assembly 125 is also a thin rectangular prism.

Light with a high incident angle stays within the inner core 110, while light with a lower incident angle is contained within the outer cladding 120 and the inner core 110.

In one embodiment, a luminescent material 130 is disposed at the edges of the waveguide 100. In this disclosure, the term "edges" refers to the dimension perpendicular to the longer dimensions of the assembly 125. For example, in FIG. 3A, the layers are shown as being horizontal planes, while the luminescent material 130 is disposed vertically at the outer edges of the assembly 125. Typically, the "edge" corresponds to the short dimension of the assembly 125. All of the edges form the perimeter of the waveguide 100. Thus, the term "perimeter" refers to all of the edges that comprise the assembly 125 used to create the waveguide 100.

The luminescent material 130 may be any material that emits light. For example, in certain embodiments, the luminescent material may be a phosphor. In one particular embodiment, the phosphor emits red light when excited by blue light. Phosphors include micrometer powders of zinc sulfide, ZnS, or cadmium selenide, CdSe. These powders are usually mixed with a polymer of the desired index and applied at the edges of the waveguide 100 either in the inner core 110, the outer cladding 120 or in both layers as the waveguide 100 is being manufactured. In some embodiments, the luminescent material 130 may be disposed within the perimeter of the waveguide 100 to secure a more sensitive area on the printed circuit board.

FIG. 3B shows a top view of the waveguide 100, where the luminescent material 130 is disposed around the entire perimeter of the waveguide 100. In other words, the luminescent material 130 may be disposed on all edges of the waveguide 100. In other embodiments, the luminescent material 130 may be disposed on a subset of the edges of the waveguide 100. In all embodiments, the luminescent material 130 is disposed on at least a portion of one edge of the waveguide 100. In certain embodiments, the luminescent material 130 may be disposed on at least a portion of several edges of the waveguide 100. The thickness of the luminescent material 130 may vary, and may be between 10 micrometers and 2 millimeters.

In another embodiment, also shown in FIG. 3B, luminescent material 131 may be disposed within the inner core 110, the outer cladding 120 or both layers. In other words, the luminescent material 131 is disposed within the perimeter of the waveguide 100.

Further, in certain embodiments, the luminescent material 130 may be disposed along at least part of the perimeter and luminescent material 131 is also disposed within the perimeter of the waveguide 100.

Figure 4:
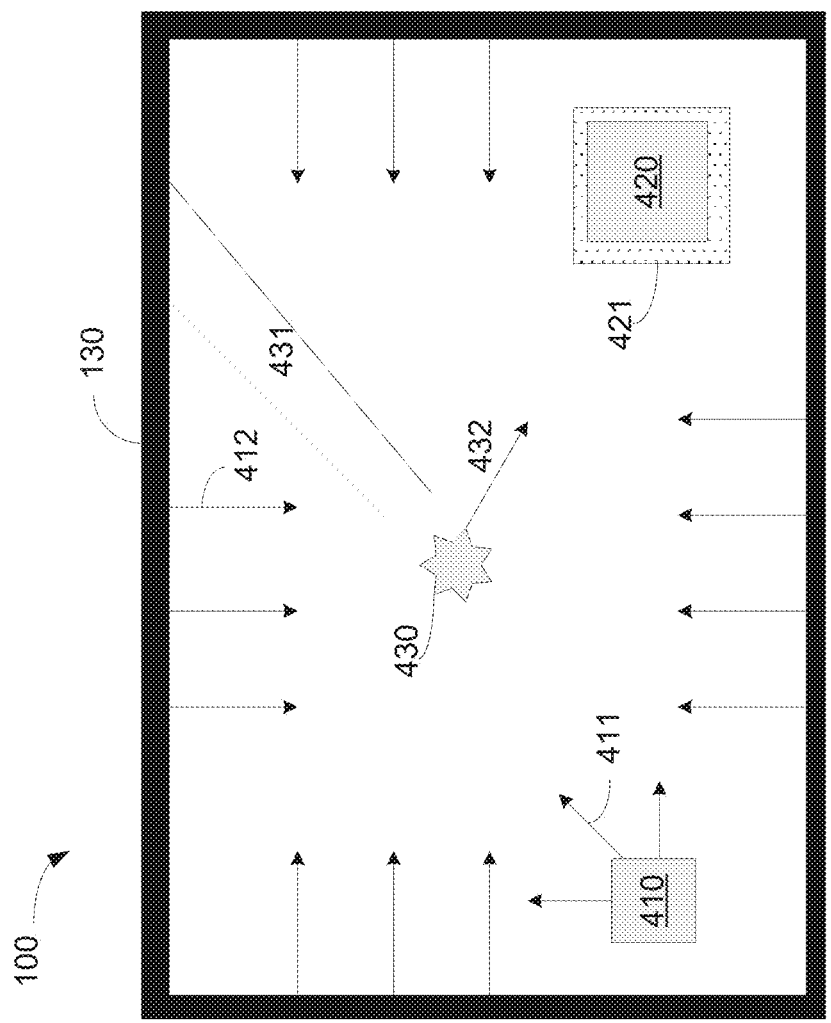
FIG. 4 shows the waveguide of FIG. 3 with an intrusive probe.

FIG. 4 shows the waveguide 100 disposed on a printed circuit board. The printed circuit board includes a blue light source 410, which may be one or more blue LEDs. The printed circuit board also includes an image sensor 420. Blue light 411 enters the waveguide 100 from the blue light source 410 and traverses the waveguide 100. When the blue light 411 reaches the edges of the waveguide 100, the blue light 411 strikes the luminescent material 130, which, in this embodiment, is disposed around the perimeter of the waveguide 100. The luminescent material 130 then emits red light 412. Both the blue light 411 and the red light 412 reach the image sensor 420 and combine to create the reflected light pattern. In certain embodiments, an optical filter 421 may be disposed between the waveguide 100 and the image sensor 420. The optical filter 421 may attenuate the blue light 411 to more closely match the intensities of the blue light 411 and the red light 412. In certain embodiments, the image sensor 420 may be a color image sensor, such as a CCD image sensor.

In the event that a probe 430 penetrates the waveguide 100, it reflects some of the blue light 411 emitted from the blue light source 410 toward the image sensor 420 as reflected light 432. However, in addition, it also casts a shadow 431 downstream from the blue light source 410.

Wherever the shadow 431 extends to the perimeter, the luminescent material 130 will not be excited, and therefore will not emit any red light 412. Thus, the amount of red light 412 that is produced is affected by the intrusion of the probe 430. Therefore, two different phenomenons are employed to increase the sensitivity of the reflected light pattern to intrusion. First, the path of the originally emitted blue light 411 may be reflected, deflected or blocked by the probe 430. Additionally, the production of red light 412 may be altered by the creation of shadows by the probe 430. These two mechanisms create a much greater change in the reflected light pattern captured by the image sensor 420 than is achieved in the prior art.

Further, in certain embodiments, multiple blue light sources 410, disposed at different locations, may be used to further increase the effect that an inserted probe may have in the reflected image sensor.

As explained above, in certain embodiments, the luminescent material may be disposed within the perimeter of the waveguide 100, so as to create additional light sources within the waveguide 100. This may be in addition to, or instead of, the luminescent material disposed along the perimeter.

While the above disclosure describes the use of blue light sources 410 with luminescent material 130 that generates red light, other embodiments are also possible. For example, in certain embodiments, the light sources 410 emit a light having a first wavelength. The luminescent material 130 absorbs the light having the first wavelength, and emits a light having a second wavelength. In certain embodiments, the second wavelength is greater than the first wavelength.

FIG. 5A shows a cross section of a printed circuit board having the waveguide 100 of FIG. 3A. FIG. 5B shows a top view of the printed circuit board. As shown in FIG. 5A, the waveguide 100 is disposed on top of the printed circuit board 500. A blue light source 410 is used to inject light into the waveguide 100. The reflected light is received by an image sensor 420, disposed on the printed circuit board 500, separate from the blue light source 410. FIG. 5B shows a top view of the printed circuit board 500. In certain embodiments, the waveguide 100 (shown in dashed lines) is used to cover several components disposed on the printed circuit board 500. Disposed on the printed circuit board is a memory element 513 that contains the code executed by the processing unit 514. In operation, the code in the memory element 513 may be encrypted, where the key needed to decrypt the code is defined by the light pattern at the image sensor 420. In some embodiments, a decryption circuit 515 is also disposed on the printed circuit board 500. The decryption circuit 515 uses the light pattern from the image sensor 420 as the key to decrypt the encrypted code, and then passes this decrypted code to the processing unit 514. To protect the security and confidentiality of the code, certain components on the printed circuit board 500 are covered by the waveguide 100. For example, the processing unit 514, which receives the decrypted code, may be covered by the waveguide 100. In addition, the decryption circuit 515, which outputs decrypted code, may also be covered by the waveguide 100. The memory element 513 may optionally also be covered by the waveguide 100. In other words, decrypted code and the light pattern output from the image sensor 420 remain hidden under the waveguide 100. Additionally, the blue light source 410 and the image sensor 420 are located beneath the waveguide 100.

In this way, if one were to attempt to interrogate the printed circuit board 500 to gain access to the decrypted code, one would necessarily have to pierce or remove the waveguide 100. However, any manipulation of the waveguide 100 will affect the way that light is reflected within the waveguide 100, thereby affecting the light pattern received at the image sensor 420, as described above. This change in the light pattern modifies the key, and renders the circuit unusable. Thus, the waveguide of FIGS. 3A-3B may be used to create a physically unclonable function (PUF) on a printed circuit board.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Furthermore, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed:

1. A physically unclonable function, comprising:
    a printed circuit board; and
    a waveguide, disposed on the printed circuit board, the waveguide comprising:
        an assembly comprising an inner core, having a first refractive index; and
            an outer cladding, covering at least a portion of the inner core, having a second refractive index, wherein the assembly forms a thin rectangular prism; and
        a luminescent material disposed on an interior of the assembly;
    wherein the printed circuit board comprises:
        a light source for emitting a light into the waveguide;
        an image sensor for receiving a light pattern created by the light traversing the waveguide;
        a processing unit;
        a memory element containing encrypted code to be executed by the processing unit; and
        a decryption circuit to decrypt the encrypted code stored in the memory element, wherein the light pattern is used to create a key used by the decryption circuit.

2. The physically unclonable function of claim 1, wherein the processing unit and the decryption circuit are disposed beneath the waveguide.

3. The physically unclonable function of claim 1, wherein the memory element is disposed beneath the waveguide.

4. The physically unclonable function of claim 1, wherein the light source emits light having a first wavelength, and the luminescent material absorbs the light having the first wavelength, and emits light having a second wavelength, greater than the first wavelength.

5. The physically unclonable function of claim 1, wherein the light source comprises a blue light source.

6. The physically unclonable function of claim 1, wherein the luminescent material is a phosphor that absorbs blue light and emits red light.

7. The physically unclonable function of claim 1, further comprising an optical filter disposed between the waveguide and the image sensor.

8. The physically unclonable function of claim 1, wherein the image sensor is a color image sensor.

9. The physically unclonable function of claim 1, wherein the luminescent material is disposed on an entire perimeter of the assembly.

10. The physically unclonable function of claim 1, wherein the luminescent material is disposed within the inner core.

11. The physically unclonable function of claim 1, wherein the luminescent material is disposed within the outer cladding.

* * * * *